(12) United States Patent
Dewall et al.

(10) Patent No.: US 9,672,126 B2
(45) Date of Patent: Jun. 6, 2017

(54) HYBRID DATA REPLICATION

(75) Inventors: Rhett Dondi Dewall, Superior, CO (US); Heping Shang, Walnut Creek, CA (US)

(73) Assignee: SYBASE, INC., Dublin, CA (US)

( * ) Notice: Subject to any disclaimer, the term of this patent is extended or adjusted under 35 U.S.C. 154(b) by 361 days.

(21) Appl. No.: 13/326,892

(22) Filed: Dec. 15, 2011

(65) Prior Publication Data

US 2013/0159249 A1 Jun. 20, 2013

(51) Int. Cl.
| | | |
|---|---|---|
| G06F 17/30 | (2006.01) | |
| G06F 7/00 | (2006.01) | |
| G06F 11/20 | (2006.01) | |
| G06F 11/16 | (2006.01) | |

(52) U.S. Cl.
CPC ...... *G06F 11/2097* (2013.01); *G06F 11/1662* (2013.01); *G06F 17/30368* (2013.01); *G06F 17/30377* (2013.01); *G06F 17/30575* (2013.01); *G06F 2201/80* (2013.01); *G06F 2201/84* (2013.01)

(58) Field of Classification Search
CPC .......... G06F 17/30362; G06F 11/2082; G06F 17/30215; G06F 3/065; G06F 17/30008; G06F 17/30575; G06F 17/30371; G06F 17/30377; G06F 11/2069; G06F 11/1451; G06F 17/30368; G06F 17/30372
See application file for complete search history.

(56) References Cited

U.S. PATENT DOCUMENTS

| | | | |
|---|---|---|---|
| 4,977,594 A * | 12/1990 | Shear | 705/53 |
| 5,991,768 A * | 11/1999 | Sun | G06F 17/30575 707/104 |
| 7,509,468 B1 * | 3/2009 | Dalal et al. | 711/163 |
| 7,603,395 B1 * | 10/2009 | Bingham et al. | |
| 7,739,240 B2 | 6/2010 | Saito et al. | |
| 7,865,673 B2 | 1/2011 | Moore et al. | |
| 8,086,661 B2 | 12/2011 | Holenstein et al. | |
| 8,185,779 B2 | 5/2012 | Devarakonda et al. | |
| 9,268,811 B1 * | 2/2016 | Thakur | G06F 17/30575 |
| 2002/0133507 A1 * | 9/2002 | Holenstein et al. | 707/200 |
| 2004/0249870 A1 * | 12/2004 | Jeevanjee et al. | 707/204 |
| 2004/0254937 A1 | 12/2004 | Gernold | |
| 2005/0149578 A1 * | 7/2005 | Sustman et al. | 707/200 |
| 2005/0172092 A1 * | 8/2005 | Lam et al. | 711/161 |
| 2005/0192989 A1 * | 9/2005 | Adiba et al. | 707/101 |
| 2005/0203908 A1 * | 9/2005 | Lam et al. | 707/10 |
| 2005/0289414 A1 * | 12/2005 | Adya et al. | 714/724 |
| 2006/0047713 A1 * | 3/2006 | Gornshtein et al. | 707/202 |

(Continued)

OTHER PUBLICATIONS

Office Communication, dated Dec. 19, 2012, for U.S. Appl. No. 13/326,928, filed Dec. 15, 2011, 11 pages.

*Primary Examiner* — Marc Somers
(74) *Attorney, Agent, or Firm* — Sterne, Kessler, Goldstein & Fox P.L.L.C.

(57) ABSTRACT

System, method, computer program product embodiments and combinations and sub-combinations thereof for hybrid data replication are described. Aspects include identifying a type of database data replication, the type including a combination of replication approaches, and managing replication based on the identified type, including coordinated switching from one replication approach to another automatically with transactional consistency maintained among source and target databases.

24 Claims, 11 Drawing Sheets

(56) References Cited

U.S. PATENT DOCUMENTS

| | | | |
|---|---|---|---|
| 2006/0195666 A1* | 8/2006 | Maruyama et al. | 711/162 |
| 2007/0022129 A1 | 1/2007 | Bahar et al. | |
| 2007/0106864 A1* | 5/2007 | Moore et al. | 711/170 |
| 2009/0300304 A1* | 12/2009 | Boyd et al. | 711/162 |
| 2009/0313311 A1* | 12/2009 | Hoffmann et al. | 707/204 |
| 2010/0047392 A1 | 2/2010 | Callen et al. | |
| 2010/0122053 A1 | 5/2010 | Prahiad et al. | |
| 2010/0228819 A1 | 9/2010 | Wei | |
| 2012/0151164 A1* | 6/2012 | Nayak | 711/162 |
| 2014/0289188 A1* | 9/2014 | Shimanovsky | G06Q 30/0282 707/609 |

* cited by examiner

HYBRID DATA REPLICATION

BACKGROUND

Field of the Invention

The present invention relates generally to data processing environments and, more particularly, to a system providing methodology for hybrid data replication.

Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

Increasingly, businesses run mission-critical systems which store information on database management systems. Each day more and more users base their business operations on mission-critical systems which store information on server-based database systems, such as Sybase® Adaptive Server® Enterprise (ASE) (available from Sybase, Inc. of Dublin, Calif.). As a result, the operations of the business are dependent upon the availability of data stored in their databases. Because of the mission-critical nature of these systems, users of these systems need to protect themselves against loss of the data due to software or hardware problems, disasters such as floods, earthquakes, or electrical power loss, or temporary unavailability of systems resulting from the need to perform system maintenance.

One well-known approach that is used to guard against loss of critical business data maintained in a given database (the "primary database") is to maintain one or more standby or replicate databases. A replicate database is a duplicate or mirror copy of the primary database (or a subset of the primary database) that is maintained either locally at the same site as the primary database, or remotely at a different location than the primary database. The availability of a replicate copy of the primary database enables a user (e.g., a corporation or other business) to reconstruct a copy of the database in the event of the loss, destruction, or unavailability of the primary database.

Database replication technologies comprise a mechanism or tool for duplicating data from a primary source or "publisher" to one or more "subscribers". The data may also be transformed during this process of replication.

In many cases, a primary database may publish items of data to a number of different subscribers. Also, in many cases, each of these subscribers is only interested in receiving a subset of the data maintained by the primary database. In this type of environment, each of the subscribers specifies particular types or items of data ("subscribed items") that the subscriber wants to receive from the primary database.

In current replication environments, replication typically requires the replicate to be materialized before replication begins. Materialization refers to the process of copying data, specified by a subscriber, from a published primary database to a replicate database, thereby initializing the replicate table(s). Once materialized, replication may proceed immediately.

Depending on the needs of a given environment, continuous replication or snapshot replication may be performed following materialization. Continuous replication refers to log-based replication from a primary database to a replicate database and offers near real-time protection by capturing data completely via the log. Snapshot replication offers, a point-in-time copy, and thus, is considered mutually exclusive to continuous replication for a given primary and replicate database pair.

Such mutual exclusivity may compromise performance for certain environments that would benefit from being able to switch from one form of replication to another. For example, there may be situations, such as certain times of day, when it is known that limited activity would be occurring in a primary database, such that snapshot replication would be sufficient, while at other times, continuous would be preferable. Accordingly, a need exists for an approach to replication that avoids these limitations. The present invention addresses such a need.

BRIEF SUMMARY

Briefly stated, the invention includes system, method, computer program product embodiments and combinations and sub-combinations thereof for hybrid data replication. Aspects include identifying a type of database data replication, the type including a combination of replication approaches, and managing replication based on the identified type, including coordinated switching from one replication approach to another automatically with transactional consistency maintained among source and target databases.

Through the aspects, the capable utilization of multiple replication approaches (e.g., snapshot and continuous replication capabilities) allows greater flexibility without negatively impacting performance and/or data integrity.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for providing methodology for hybrid data replication.

Figure 1:
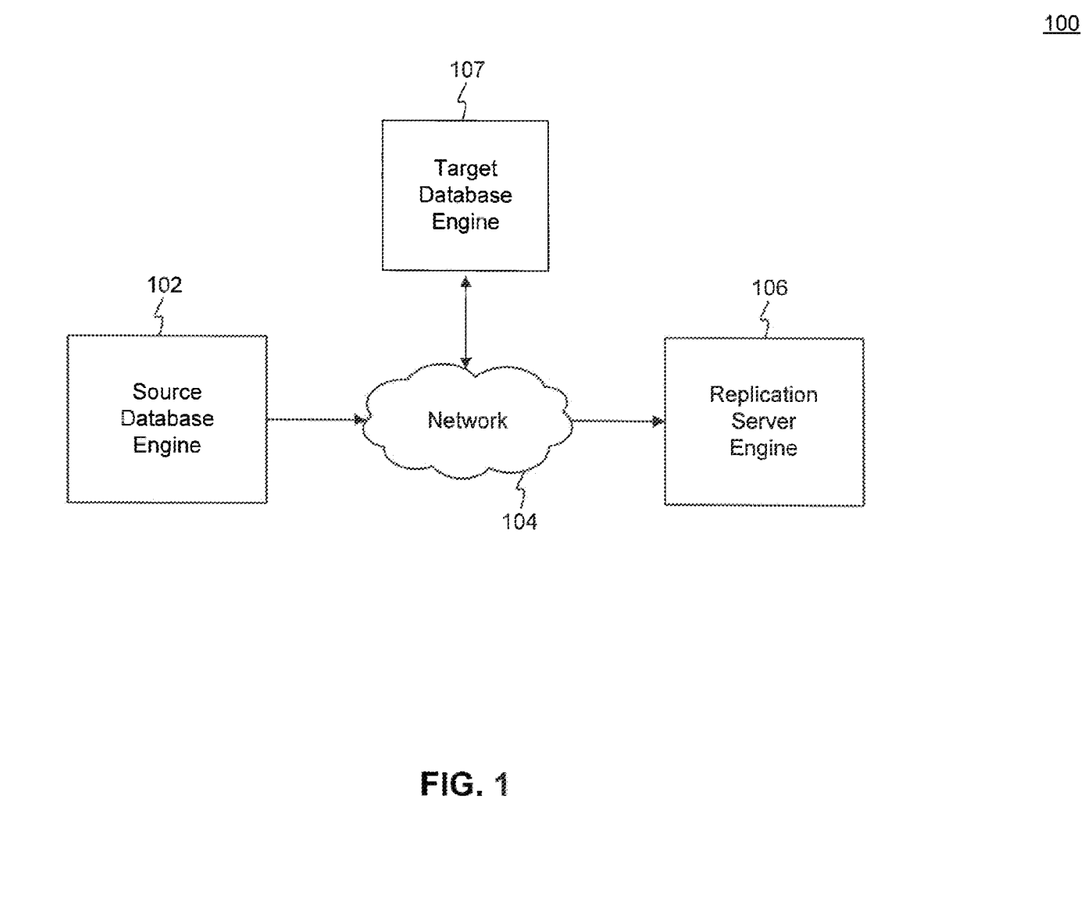
FIG. 1 illustrates a network in which the present invention, or portions thereof, can be implemented, in accordance with an embodiment of the present invention.

FIG. 1 illustrates a replication environment 100 in which the present invention, or portions thereof, can be implemented. A source database engine 102 is able to communicate over network 104 with replication engine 106, and is a source of transactions that modify data and are captured for replication and distribution to target database engine 107, via replication engine 106, in accordance with an embodiment of the present invention.

Network 104 can be any type of network or combination of networks such as, but not limited to, a local area network, wide area network, or the Internet. Network 104 may be any form of a wired network or a wireless network, or a combination thereof. One skilled in the relevant arts will further recognize that the replication environment 100 can be configured in a number of ways in order to achieve the same result, and the aforementioned configuration is shown by way of example, and not limitation. For instance, in accordance with an embodiment of the present invention, source database engine 102 may be located in a single physical computing device or cluster of computing devices.

Further source database engine 102 and target database engine 107 may be any form of database and can include, but are not limited to, a device having a processor and memory for executing and storing instructions. Such a database may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

In an embodiment, a publish-and-subscribe model for replicating data across the network 104 is utilized. Users "publish" data that is available in a primary database of the source database engine 102, and other users "subscribe" to the data for delivery in a target database of target database engine 107 via replication engine 106. Users can replicate both data changes (e.g., update, insert, and delete operations) and stored procedures using this method. An embodiment of the replication engine 106 is the Sybase Replication Server, which is well known and described in publicly available documents.

In accordance with an embodiment of the invention, replication occurs using hybrid replication that capably utilizes multiple replication approaches (e.g., snapshot and continuous replication capabilities) in a manner that allows greater flexibility, including coordinated switching between the approaches automatically, without negatively impacting performance and/or data integrity. Thus, hybrid replication, in accordance with an embodiment, includes auto-switching from snapshot to continuous once the data is materialized (e.g., 'snapshot+continuous' replication), processing intermittent and incremental snapshots (e.g., 'snapshot+snapshot' replication), or stopping continuous replication and following it with a snapshot after some time delay (e.g., 'continuous replication+snapshot' replication), with each form being applicable to publisher, subscriber, and table levels of data, and able to vary among these levels. In this manner, for example, at the table level within a publisher, the strategy policy for one table may be changed without affecting the other tables within that same publisher. In an embodiment, policy declarations enable specification of the manner and type of hybrid replication, as described in co-pending U.S. patent application Ser. No. 13/326,928, filed Dec. 15, 2011, entitled "Directing a Data Replication Environment through Policy Declaration", assigned to the assignee of the present invention and incorporated herein by reference in its entirety.

Figure 2:
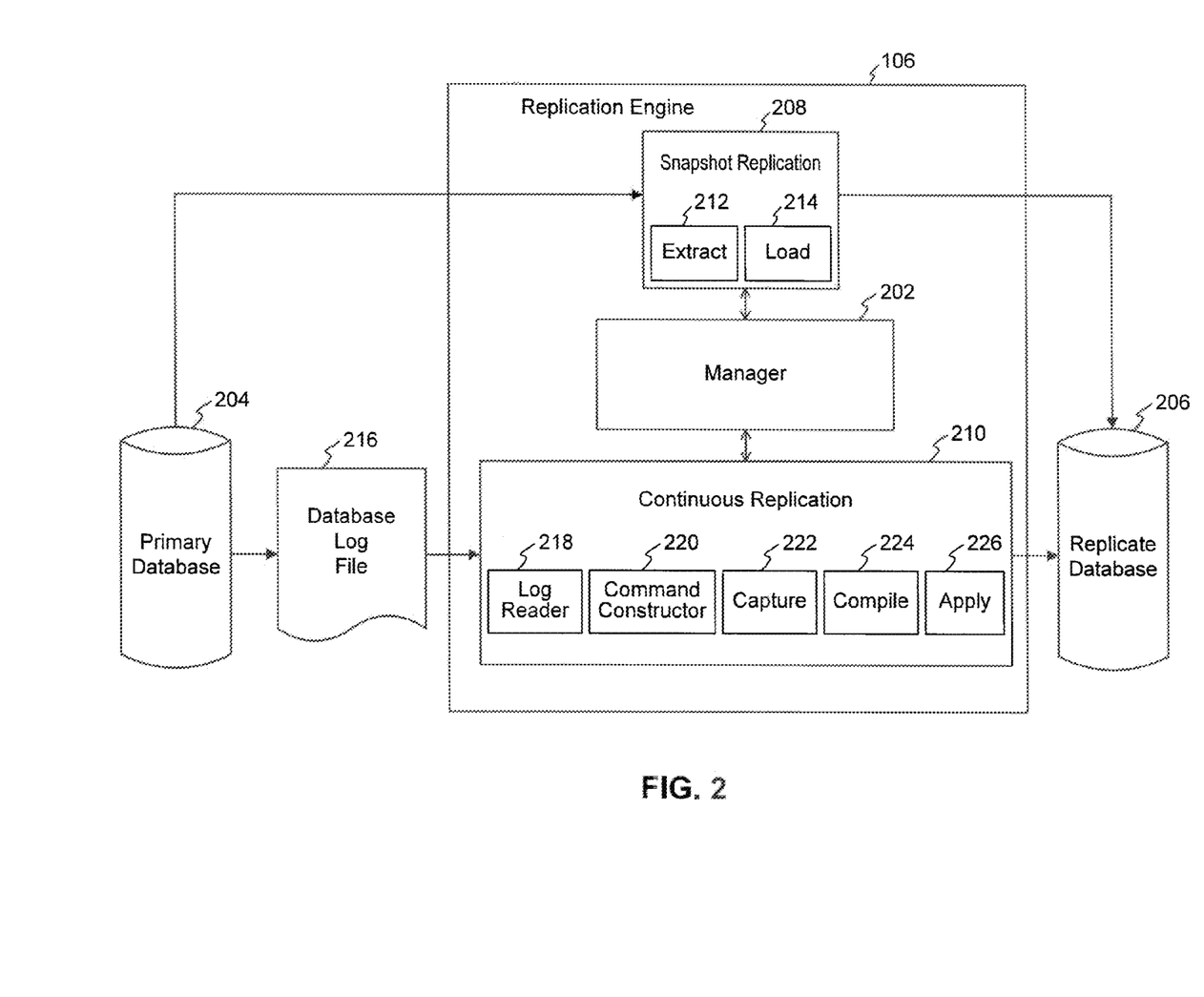
FIG. 2 is a block diagram illustrating a hybrid replication system, in accordance with an embodiment of the present invention.

Referring now to FIG. 2, a block diagram is represented and illustrates a hybrid replication system in accordance with an embodiment of the invention. Within the replication engine 106, a manager 202 identifies the type of replication (e.g., such as from a policy declaration), and manages the hybrid replication processing for replicating data from a primary database 204 to a replicate database 206 by controlling a snapshot replication module 208 and continuous replication module 210, the details of which are described herein below with reference to FIGS. 3-10. In an embodiment, for separate replications, e.g., for a given publisher-subscriber, in which some tables can be snapshot and some can be continuous, or for given multiple subscribers, in which some subscribers (and tables) can be snapshot and some can be continuous, the processes for snapshot and continuous replication may run in parallel. Further, switching between snapshot and continuous replication can occur at anytime through components acting as replication entities that provide targeted and replication-specific functionality.

In general, snapshot replication 208 operates by reading directly from primary database 204 (is non log-based) and utilizes predefined process components, extract 212 (FIG. 3) and load 214 (FIG. 4), that run in parallel to each other. Extraction is performed as publisher activity, and loading is performed as subscriber activity, with the manager 202 determining how many extract and load components are to be used for each snapshot replication being performed.

Continuous replication reads from a log 216 and utilizes a log reader 218, command constructor 220, capture 222 (FIG. 6), compile 224 (FIG. 7), and apply 226 (FIG. 8) components, where the log reader 218, command constructor 220, and capture 222 components correspond to publisher activities, and the compile 224 and apply 226 components correspond to subscriber activities.

Manager 202 plans how to most efficiently and effectively materialize tables for replication. For purposes of this disclosure, materialization refers to a process of starting log based replication. In an embodiment, the process occurs through snapshot replication (a complete snapshot including catch-up replication of data) with a switchover to log based replication.

The physical and logical operations of the process are managed by determining a number of paths and the levels of parallelism to use, including determining a number of extract and load components to deploy, and within the extract and load components, a level of concurrency used, e.g., table or partial-tables (sections), and the number of I/O (input/output) streams.

Further, materialization may be atomic or non-atomic, where atomicity refers to an operation or transaction that is guaranteed to be completed atomically, such that if any part of the operations or transaction fails, all of it will fail. Generally, atomic approaches restrict how transactions occur while data is selected, while non-atomic do not, thereby allowing transactions to be performed on the data being selected. Auto-correction, as is commonly understood, supports data consistency for non-atomic approaches in accordance with an embodiment of the invention.

Markers, such as extract begin, extract end, load begin, load end, activate, deactivate, and snapshot, are utilized as transactional commands that flow through the replication path and provide inter-component asynchronous communication. By flowing along with the data, the markers mark locations in the replication process when certain actions happen in support of the coordinated auto-switching activities of the manager 202 of potentially multiple, parallel hybrid replications, as will be more fully understood in conjunction with the description of FIGS. 3-10.

Figure 3:
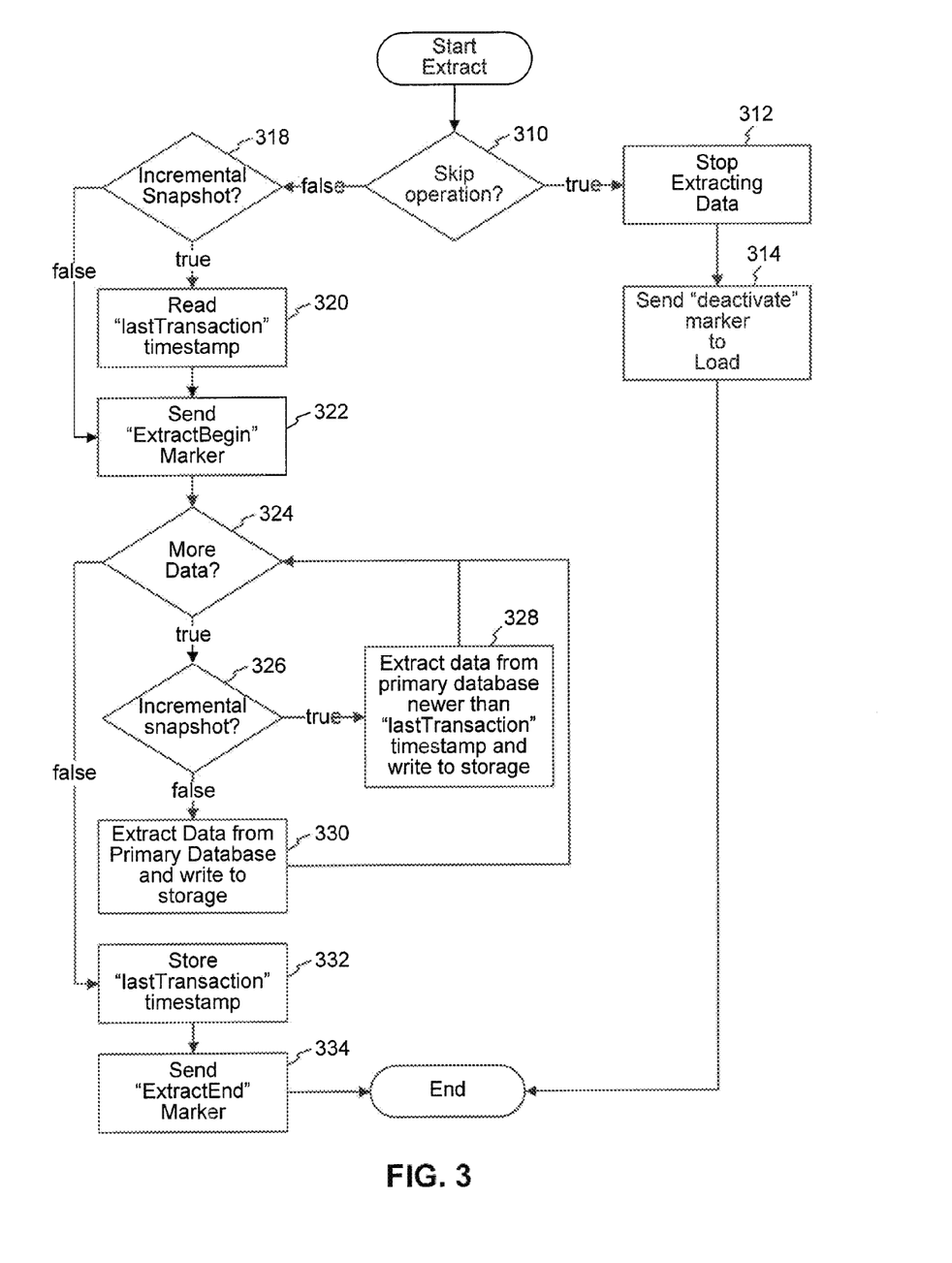
FIGS. 3, 4, 5, 6, 7, 8, 9, and 10 are flowcharts illustrating processes for hybrid replication in accordance with an embodiment of the present invention.
Figure 4:
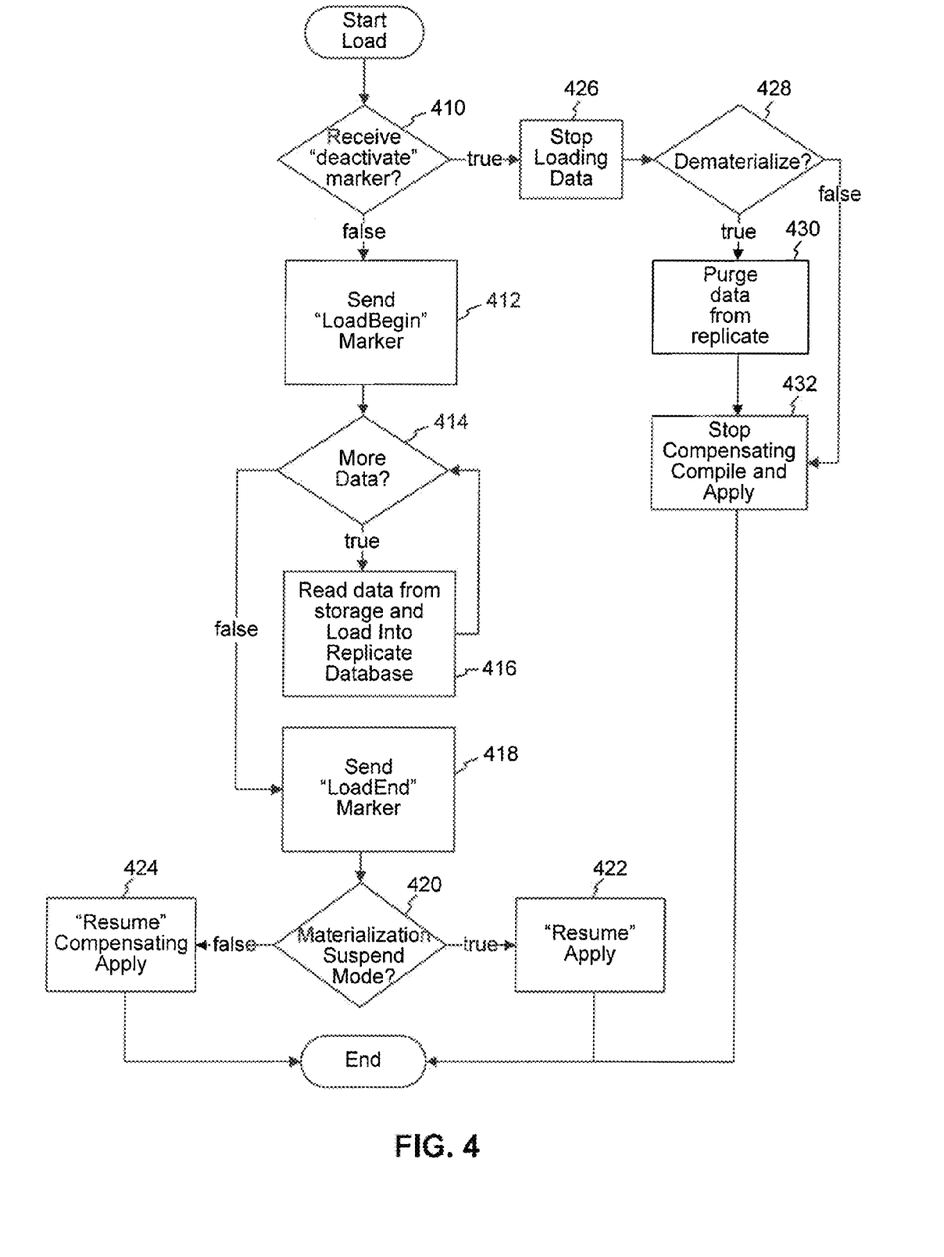

Referring now to FIGS. 3 and 4, flowchart diagrams of extract and load processing for snapshot replication, respectively, are illustrated in accordance with an embodiment of the invention. Once the extraction process starts, an initial check is made to determine if a stop operation has been signaled (block 310). If true, the extraction of data stops (block 312), and a deactivation marker is sent to the load component (block 314) before the process ends (block 316).

When no stop operation has been signaled, the process continues by determining whether the extraction is occurring during incremental snapshot replication (block 318), which, when true, causes a last transaction timestamp to be read (block 320). To support incremental snapshots, a marker named "snapshot" is utilized as described herein below. Essentially, incremental snapshots provide a slice of data in some time window without regard to the how the data arrived in that form and require a transactional consistent initial snapshot, such that a log-based replication "records" all changed data.

When the extraction is not occurring during incremental snapshot replication, (block 318 is not true), or once the timestamp has been read, an extract begin marker is signaled (block 322). As long as there is more data (as determined via block 324), it is extracted from the primary database and sent to storage. The extraction either occurs relative to the last transaction timestamp (block 328) or not (block 330), depending upon whether the replication is incremental snapshot replication (determined via block 326). Once there is no more data, a timestamp is stored to reflect the last transaction extracted (block 332), and an extract end marker is signaled (block 334) before the process ends.

For load processing, the load begins, and a check is made for receipt of a deactivate marker (block 410). If no marker has been received, a load begin marker is signaled (block 412), and the data to be loaded is read from storage and loaded into the replicate database 206 (block 416) while load data remains (as determined via block 414). When no more data needs to be loaded, a load end marker is signaled (block 418).

Once the load end is signaled, a check is made to determine whether a materialization suspend mode is set (block 420). In contrast to typical operations, which suspend replication on all tables until a materialization of a selected table completes in order to maintain consistency, utilizing compensating components in accordance with an embodiment of the invention allows materialization to occur with no suspension of non-materializing tables yet continuing to maintain consistency. The compensating components know only of the table being materialized, so they will suspend transactions occurring during the materialization of that one table, and when done, perform catch-up based on the materializing table activity. In this manner, the non-materialized tables may continue to replicate via the original compile and apply, achieving non-blocking continuous replication of tables not being materialized and supporting automatic switchover from snapshot to continuous replication.

Thus, when a set suspend mode is identified, an apply process is resumed (block 422, see FIG. 8), while when a no suspend mode is identified (block 420 is negative), a compensating apply process resumes (block 424, see FIG. 10), before the load process ends.

When the initial check for a receipt of a deactivate marker is affirmative (block 410), data loading is stopped (block 426). A check is then made to identify whether dematerialization is desired (via block 428), and if so, replicated data is purged from the replicate database (block 430). Once the purge is done or when dematerialization is not set, the compensating compile and apply components of a continuous replication flow for the table being materialized that may be active are stopped (block 432) before the load process ends.

Figure 5:
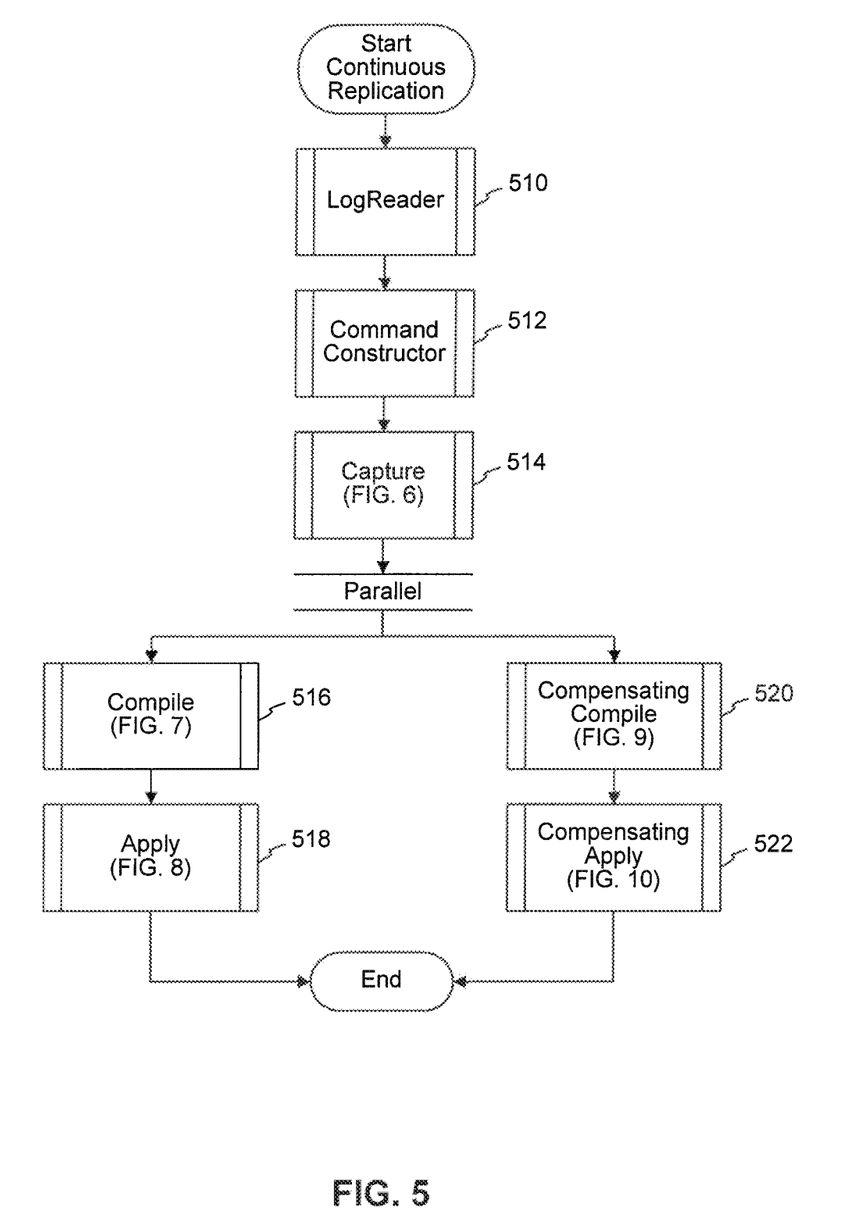

FIG. 5 illustrates a flowchart diagram of a continuous replication process in accordance with an embodiment of the invention. As mentioned previously with reference to FIG. 2, continuous replication includes a log reader process (block 510), which is a straightforward and well-known process of reading the primary database log 216. Once the log 216 is read, the construction of commands follows (block 512) also using well-known techniques. A capture process then occurs (block 514).

Figure 6:
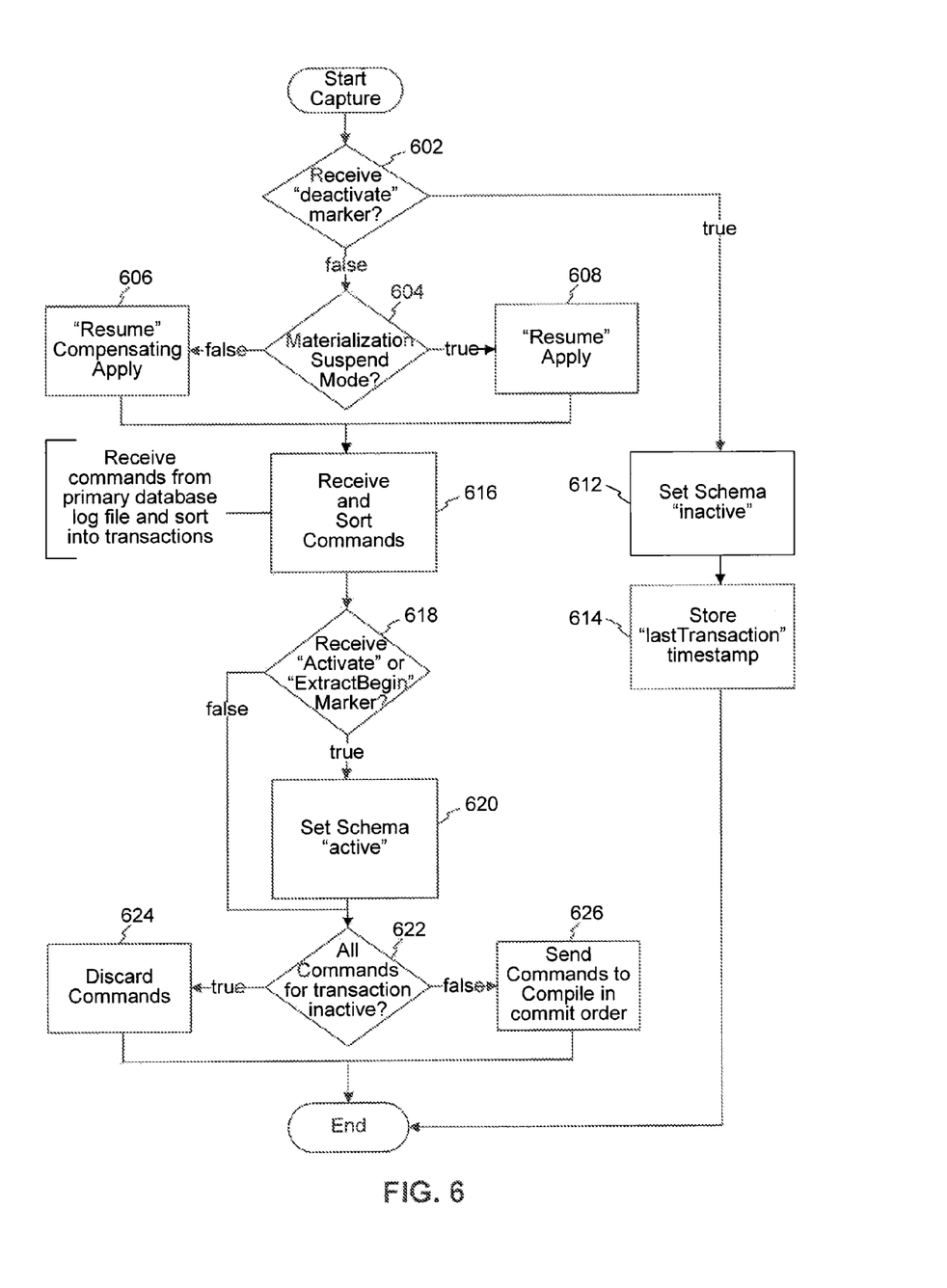

Referring now to FIG. 6, a flowchart diagram of the capture process (block 514) in accordance with an embodiment is presented. The capture begins and a determination is made to identify whether a deactivate marker has been received (block 602). If so, the schema (i.e., the state data unique to the component for the replicating table) is set inactive (block 612), and the timestamp of the last transaction is stored (block 614) before the capture ends.

When no deactivate marker has been received, a check is made to determine whether materialization is to occur with or without suspend mode (block 604) to account for an embodiment in which snapshot replication follows snapshot replication (assuming log-based change data is accumulating from the previous snapshot). Upon receipt of an externally issued "snapshot" marker to the primary database, when in no-suspend mode (block 604 is false), the compensating apply is resumed (block 606), while when in suspend mode (block 604 is true), apply is resumed (block 608).

Subsequently, including when no externally issued "snapshot marker is received, commands from the primary database log file are received and sorted into transactions (block 616). A check is then made for an activate or extract begin marker (block 618) that results in the schema being set to active (block 620) when true. Processing continues by determining whether all commands for a transaction are inactive (block 622). If true, the commands are discarded (block 624), or if false, the commands are sent to the compile component in commit order (block 626) before the capture ends.

Once the capture ends, compile and apply occurs, as shown in FIG. 5. For completeness, the flow of FIG. 5 following the capture (block 514) includes all components involved during continuous replication, with compile (block 516) and apply (block 518) and compensating compile (block 520) and compensating apply (block 522) (C-compile and C-apply) components running in parallel to each other. As described previously, the C-compile and C-apply components (collectively referred to as compensating subscribers) allow for the materialization to occur with no suspend, the processes for which are presented more fully herein below with reference to FIGS. 9-10.

Figure 7:
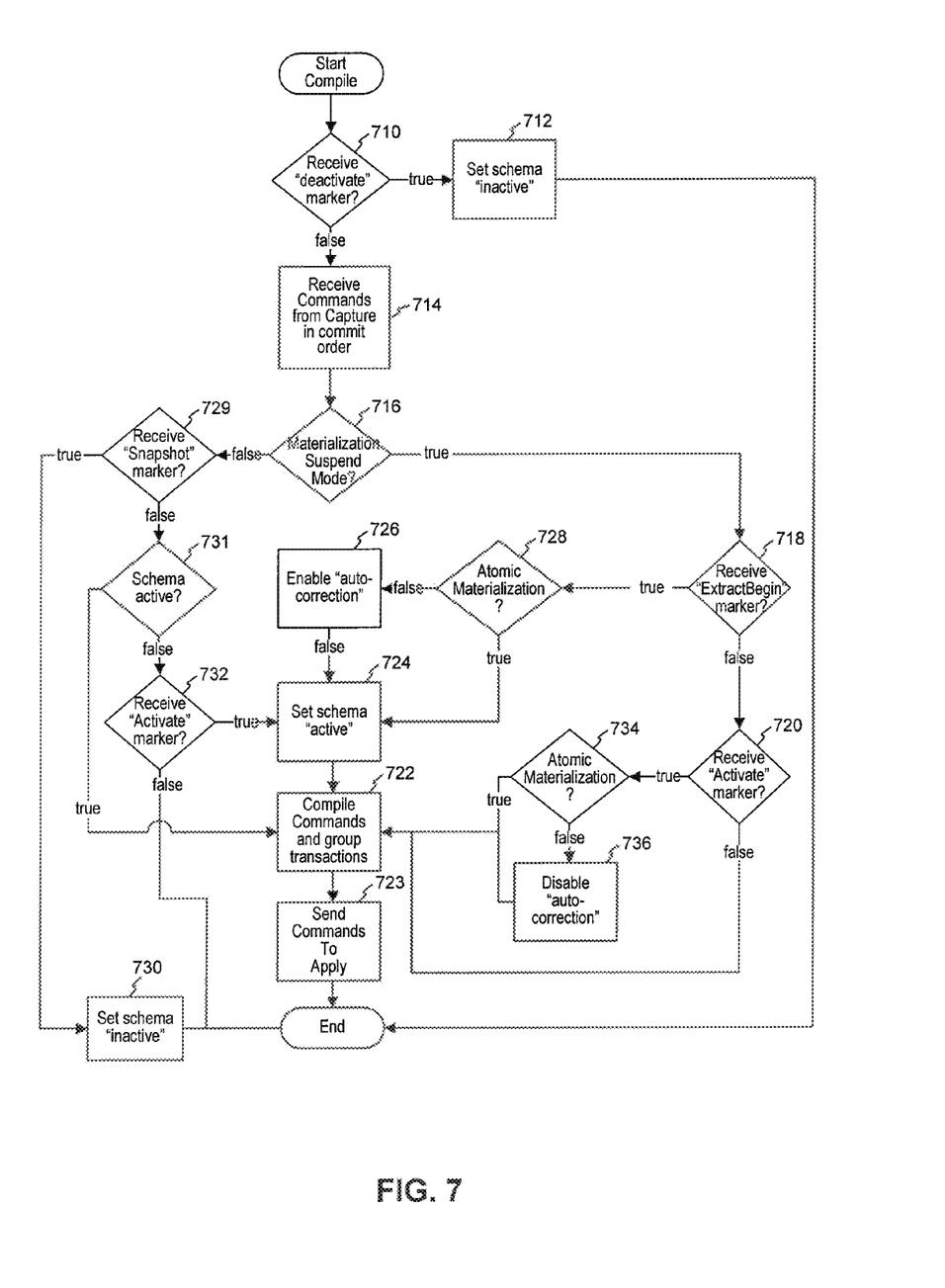

Referring now to FIG. 7, a flowchart diagram for a compile process 516 in accordance with an embodiment of the invention is illustrated. Unless a deactivate marker has been received (determined via block 710), which causes the materialization schema to be set inactive (block 712) and ends the process, the compile proceeds with receipt of the commands in commit order from the capture component (block 714). A determination of whether the materialization is being done in suspend mode follows (block 716). When true, and no extract begin or end markers have been received (as determined via blocks 718 and 720), the commands are compiled and the transactions grouped (block 722). The commands are then sent to the apply component (block 723) and the compile ends.

When the materialization is not being done in suspend mode (block 716 is negative), a check for receipt of a "snapshot" marker is done (block 729) to account for an embodiment in which continuous replication is followed by snapshot replication. When received, the schema is marked inactive (block 730) and the compile process ends. When a "snapshot" marker has not been received, and the schema is active (as determined via block 731), the process continues with the compilation of commands and grouping of transactions (block 722). The commands are then sent to the apply component (block 723), and the process ends.

The schema is set to active (block 724), either when an extract begin marker has been received and after enabling auto-correction (block 726) when the materialization is not atomic (determined via block 728), or when the schema is not active (block 731 is false) and an activate marker has been received (determined via block 732). If no activate marker is received (block 732 is negative), the process ends.

Figure 8:
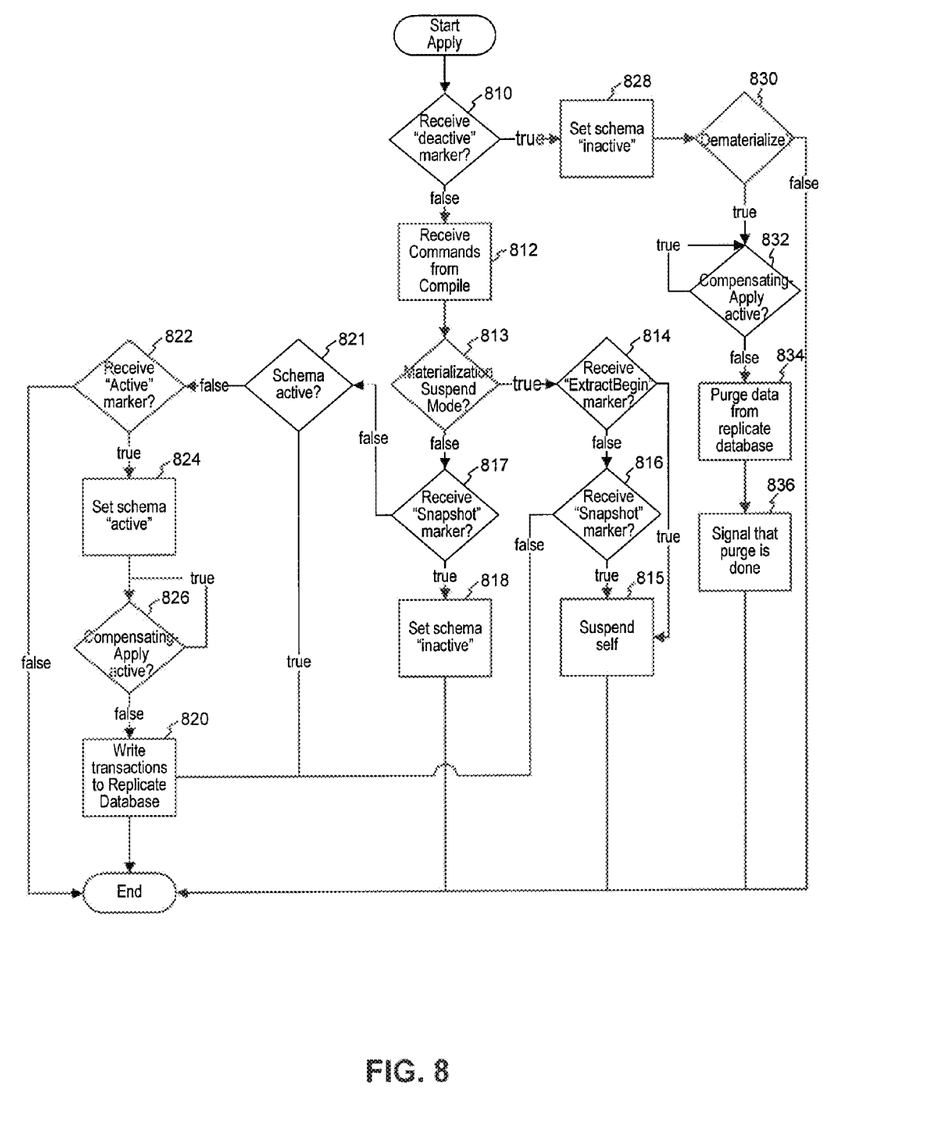

FIG. 8 illustrates a flowchart diagram of the apply component processing in accordance with an embodiment of the invention. When no deactivate marker has been received (as determined via block 810), the commands are received from the compiler (block 812), and a check is made to identify if materialization is being done in suspend mode (block 813). When true, and an extract begin marker has been received (determined via block 814), the apply process suspends itself (block 815), and the process ends. The apply process also suspends itself when no extract begin marker has been received, and a snapshot marker has been received (as determined via block 816). When a snapshot marker has not been received, the transactions are written to the replicate database (block 820) and the process ends. The process also ends following setting of the schema to inactive (block 818) when the materialization is not being done in suspend mode, and a snapshot marker has been received (as determined via block 817). Alternatively, the process ends when the materialization is not being done in suspend mode, no snapshot marker has been received, the schema is not active, and no activate marker has been received (as determined via blocks 813, 817, 821 and 822).

When an activate marker has been received, the schema is set to active (block 824). The processing loops until a compensating apply is no longer active (determined via block 826), enabling catch-up replication of the materialized table to complete prior to resuming normal continuous replication activity on the materialized table, and then proceeds with writing the transactions to the replicate database (block 820). Writing the transactions is reached also when the schema is already set to active (determined via block 821).

When a deactivate marker has been received, the schema is marked as inactive (block 828), and if dematerialization is not needed (determined via block 830), the process ends. If dematerialization is needed, the processing loops until a compensating apply is no longer active (via block 832), and then purges the replicated data from the replicate database (block 834), signals the completion of the purge (block 836), and ends.

Figure 9:
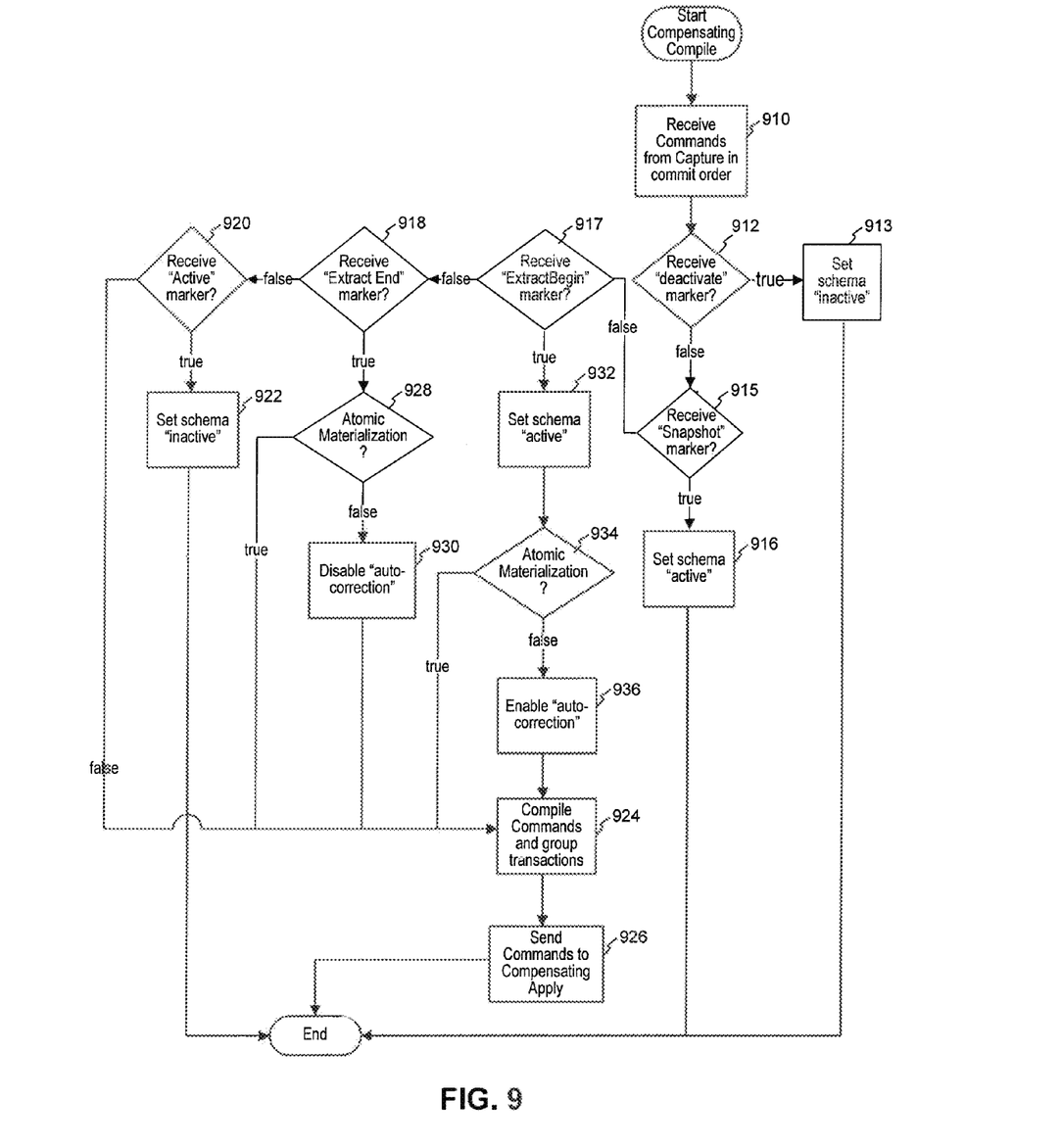

FIG. 9 illustrates a flowchart diagram of a compensating compile process in accordance with an embodiment of the invention. It initiates and receives commands from the capture process 514 (FIG. 6) in commit order (block 910). If a deactivate marker is received (determined via block 912), the schema is set to inactive (block 913), and the process ends. If not received, a check is made for receipt of a snapshot marker (block 915), and when received, the schema is marked active (block 916) and the process ends.

When no snapshot marker has been received (block 915 is negative), a check is made for an extract begin marker (block 917). If no extract begin or end marker is received (determined via block 918), and an activate maker is received (determined via block 920), the schema is marked inactive and the process ends. When no activate marker is received, the commands are compiled and the transactions grouped (block 924) for sending to the compensating apply (block 926) before the process ends.

The compilation also is reached when an extract end marker is received and after determining if atomic materialization is needed (block 928), and after auto correction is disabled (block 930) when atomic materialization is not needed. Alternatively, when an extract begin marker has been received, the schema gets marked active (block 932), and the need for atomic materialization is checked (via block 934), to enable auto correction appropriately (block 936) before proceeding with compilation (block 924) for sending to the compensating apply (block 926) before the process ends.

Figure 10:
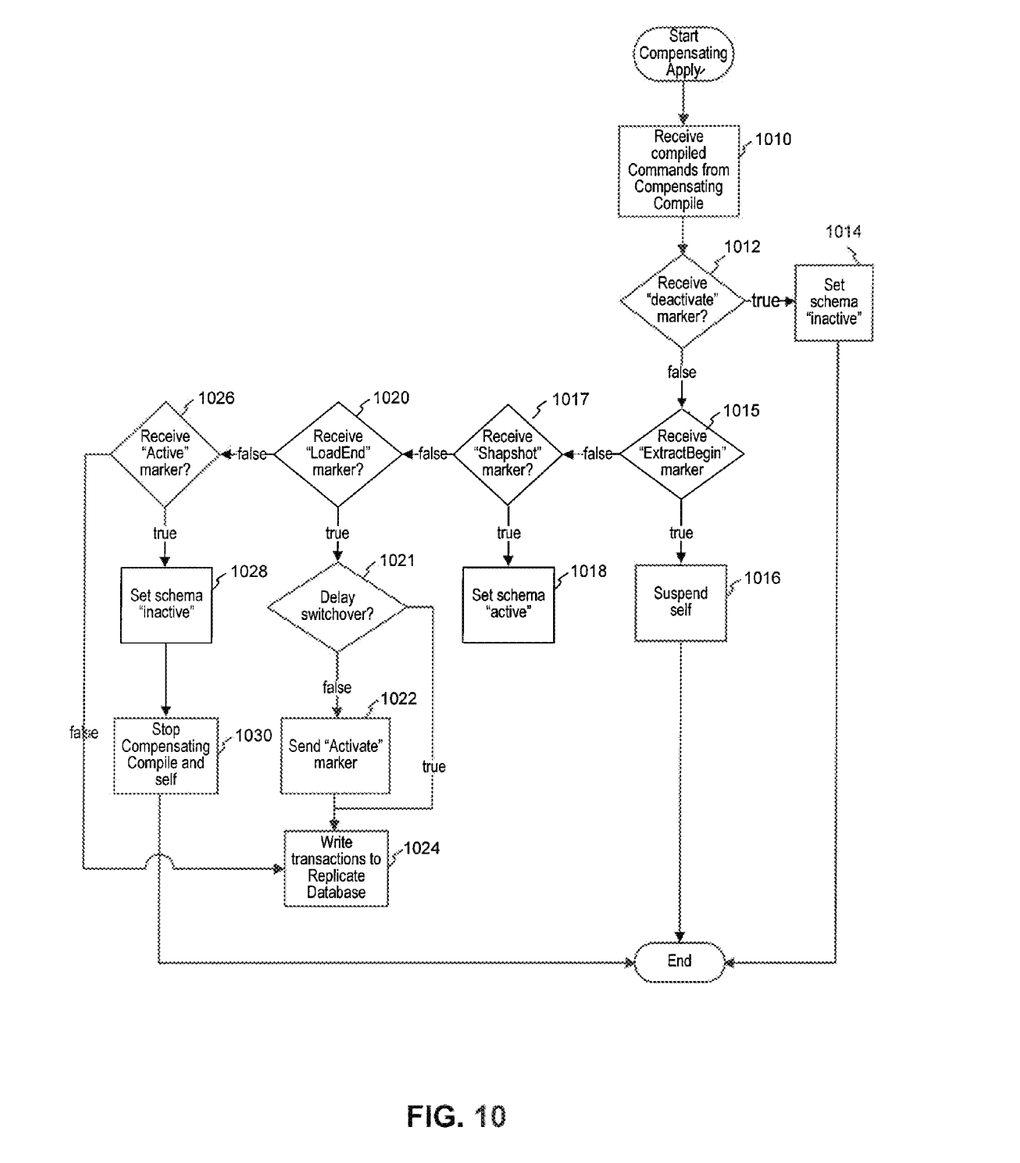

The compensating apply process 522 in accordance with an embodiment is illustrated by the block flow diagram of FIG. 10. It initiates and receives the compiled commands from the compensating compile (block 1010). If a deactivate marker is received (determined via block 1012), the schema is set to inactive (block 1014) and the process ends. If not deactivated but an extract begin marker is received (determined via block 1015), the compensating apply suspends itself (block 1016), and the process ends. The compensating apply also suspends itself when no extract begin marker has been received, but a snapshot marker has been received (as determined via block 1017), and the schema has been set to active (block 1018).

When no snapshot marker is received but a load end marker is received (determined via block 1020) and there is no delay switchover (determined via block 1021), an activate marker is sent (block 1022). Once the activate marker is sent or when there is a delay switchover (block 1021 is affirmative), the transactions are written to the replicate database (block 1024), and the process ends. Alternatively, the transaction writing is reached when the load end marker is not received, and no activate marker has been received (determined via block 1026). When the activate marker has been received, the schema is marked inactive (block 1028), and the compensating compile is stopped, as well as the compensating apply itself, (block 1030), before the process ends.

As described herein, hybrid replication in accordance with the present invention supports switching replication approaches, as desired. For example, snapshot replication can be followed by continuous replication, either in an automatic form or a manual form, without compromising a transactionally consistent state. The automatic form occurs via compensating subscribers and markers, with a switch over to continuous replication. A manual case occurs when a snapshot replication was requested without materialization, and then at some later time the same entity is started with continuous replication. In such cases, the activate marker would be sent from an external source, such as a stored procedure, instead of an implicit send from the compensating subscriber. Further, whether the switching occurs from non-log-based to log-based, from log-based to non-log-based, from non-log-based to non-log-based (incremental snapshot), or from log-based to log-based, one table's replication occurs without impacting other tables in the same publisher/subscriber.

Figure 11:
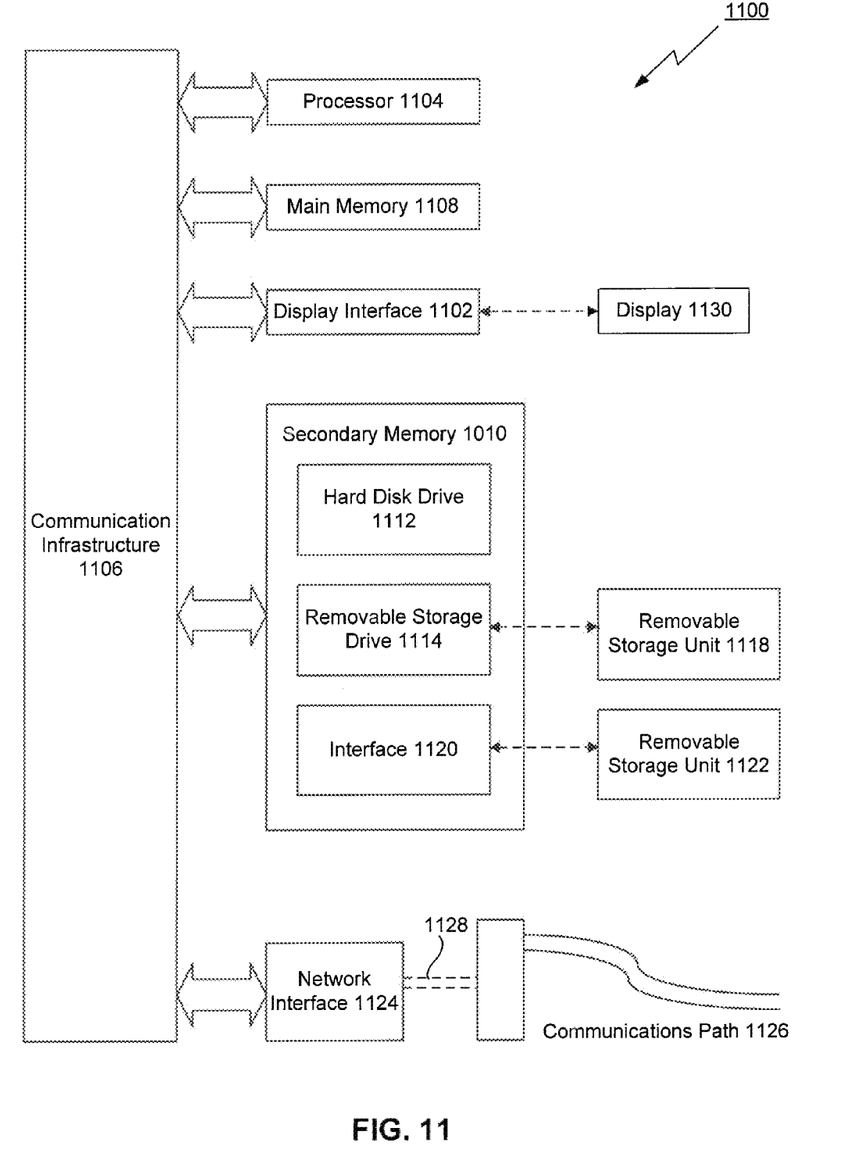
FIG. 11 illustrates an example computer useful for implementing components of embodiments of the invention.

Various aspects of the present invention can be implemented by software, firmware, hardware, or a combination thereof. FIG. 11 illustrates an example computer system 1100 in which the present invention, or portions thereof, can be implemented as computer-readable code. For example, the methods illustrated by the flowcharts of FIGS. 3-10, can be implemented in system 1100. Various embodiments of the invention are described in terms of this example computer system 1100. After reading this description, it will become apparent to a person skilled in the relevant art how to implement the invention using other computer systems and/or computer architectures.

Computer system 1100 includes one or more processors, such as processor 1104. Processor 1104 can be a special purpose or a general purpose processor. Processor 1104 is connected to a communication infrastructure 1106 (for example, a bus or network).

Computer system 1100 also includes a main memory 1108, preferably random access memory (RAM), and may also include a secondary memory 1110. Secondary memory 1110 may include, for example, a hard disk drive 1112, a removable storage drive 1114, and/or a memory stick. Removable storage drive 1114 may comprise a floppy disk drive, a magnetic tape drive, an optical disk drive, a flash memory, or the like. The removable storage drive 1114 reads from and/or writes to a removable storage unit 1118 in a well known manner. Removable storage unit 1118 may comprise a floppy disk, magnetic tape, optical disk, etc. which is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124.

Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 are in the form of signals which may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Signals carried over communications path 1126 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor 1104 to implement the processes of the present invention, such as the method illustrated by the flowcharts of FIGS. 3-10. Accordingly, such computer programs represent controllers of the computer system 1100. Where the invention is implemented using software, the software may be stored in a computer program product and loaded into computer system 1100 using removable storage drive 1114, interface 1120, hard drive 1112 or communications interface 1124.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method, the method comprising:
   identifying, by a computing device and upon completion of a load process, within a hybrid data replication process, a type of database data replication, the type including a snapshot replication approach and a continuous replication approach, each approach occurring during the hybrid data replication process;
   receiving, by the computing device, replication process markers that determine how database data replication is to change during the hybrid data replication process, wherein the replication process markers identify whether transactions were suspended during the load process;
   determining, based on the markers, that a first set of data was not suspended, and a second set of data was suspended;
   compiling a set of transactions that occurred on the second set of data during a suspended period, wherein the compiling occurs in parallel with the first set of data continuing to replicate using the continuous replication approach based on a first compilation; and
   applying the compiled set of transactions to the second data set.

2. The computer-implemented method of claim 1 wherein the type further comprises a combination of log-based replication followed by non-log-based replication, complete non-log-based replication followed by incremental non-log-based replication, and non-log-based replication followed by log-based replication.

3. The computer-implemented method of claim 1, wherein one or more compensating components perform the determining, compiling, and applying.

4. The computer-implemented method of claim 3 further comprising utilizing the compensating components for replication without complete suspension, wherein the set of transactions for a table storing the second set of data are suspended while the table is being materialized, and while the continuous replication approach for the non-materialized first set of data stored in a second table continues.

5. The computer-implemented method of claim 1 wherein the type changes based on a level of a table of database data, a publisher of database data, and a subscriber of database data.

6. The computer-implemented method of claim 1 wherein the type changes among tables of a same source database.

7. The computer-implemented method of claim 6 wherein coordinated switching for one table occurs while replication of another table continues uninterrupted.

8. The computer-implemented method of claim 1, further comprising:
   managing multiple replication approaches in parallel, including a log and non-log based replication approach.

9. The method of claim 1 wherein a manager identifies the strategy policy for the non-materialized second table for database data replication.

10. The method of claim 1 wherein the continuous replication is log-based and wherein the snapshot replication is not log based.

11. The method of claim 1, wherein the replication process markers are used during the snapshot replication to support a switchover to the continuous replication.

12. The method of claim 1, wherein the materialization is atomic.

13. A system for hybrid data replication in a database system environment, the system comprising:
   a source database;
   a target database; and
   a replication processing system in communication with the source database and target database, replication processing system configured to:
   identify, within a hybrid data replication process and upon completion of a load process, a type of database data replication, the type including a snapshot replication approach and a continuous replication approach, each approach occurring during the hybrid data replication process;
   receive replication process markers that determine how database data replication is to change during the hybrid data replication process, wherein the replication process markers identify whether transactions were suspended during the load process;
   determine, based on the markers, that a first set of data was not suspended, and a second set of data was suspended;
   compile a set of transactions that occurred on the second set of data during a suspended period, wherein the compiling occurs in parallel with the first set of data continuing to replicate using the continuous replication approach based on a first compilation; and
   apply the compiled set of transactions to the second data set.

14. The system of claim 13 wherein the type further comprises a combination of log-based replication followed by non-log-based replication, complete non-log-based replication followed by incremental non-log-based replication, and non-log-based replication followed by log-based replication.

15. The system of claim 13, wherein one or more compensating components are configured to perform the determining, compiling, and applying.

16. The system of claim 15 wherein the replication processing system further utilizes the compensating components for replication without complete suspension, wherein the set of transactions for a table storing the second set of data are suspended while the table is being materialized, and while the continuous replication approach for the non-materialized first set of data stored in a second table continues.

17. The system of claim 13 wherein the type changes based on a level of a table of database data, a publisher of database data, and a subscriber of database data.

18. The system of claim 13 wherein the type changes among tables of a same source database.

19. The system of claim 18 wherein coordinated switching for one table occurs while replication of another table continues uninterrupted.

20. The system of claim 13 wherein the replication processing system further manages multiple replication approaches in parallel, including a log and non-log based replication approach.

21. A computer program product having control logic stored therein embodied within a non-transitory computer readable medium, said control logic enabling a processor to perform hybrid data replication in a database system environment, the control logic comprising:

computer readable program code enabling a processor to:

identify, within a hybrid data replication process and upon completion of a load process, a type of database data replication, the type including a snapshot replication approach and a continuous replication approach, each approach occurring during the hybrid data replication process;

receive replication process markers that determine how database data replication is to change during the hybrid data replication process, wherein the replication process markers identify whether transactions were suspended during the load process;

determine, based on the markers, that a first set of data was not suspended, and a second set of data was suspended         compile a set of transactions that occurred on the second set of data during a suspended period, wherein the compiling occurs in parallel with the first set of data continuing to replicate using the continuous replication approach based on a first compilation; and         apply the compiled set of transactions to the second data set.

22. The computer program product of claim 21 wherein the type further comprises a combination of log-based replication followed by non-log-based replication, complete non-log-based replication followed by incremental non-log-based replication, and non-log-based replication followed by log-based replication.

23. The computer program product of claim 21, the computer readable program code further enabling the processor to manage components for publishers and subscribers, including compensating components that perform the determining, compiling, and applying.

24. The computer program product of claim 21 wherein the type changes based on a level of a table of database data, a publisher of database data, and a subscriber of database data.

* * * * *